May 5, 1925.  1,536,487

L. FLESCH

ROLLER BEARING

Original Filed June 1, 1921

INVENTOR
LEO FLESCH.
BY
Pennie Davis, Marvin & Edmonds,
his ATTORNEYS.

Patented May 5, 1925.

1,536,487

UNITED STATES PATENT OFFICE.

LEO FLESCH, OF ELBERFELD, GERMANY.

ROLLER BEARING.

Continuation of application Serial No. 474,212, filed June 1, 1921. This application filed July 14, 1922. Serial No. 575,123.

*To all whom it may concern:*

Be it known that I, LEO FLESCH, a citizen of the German Empire, residing at Elberfeld, in the State of Germany, have invented certain new and useful Improvements in Roller Bearings; and I do hereby declare the following to be a full, clear, and exact description of the invention, such as will enable others skilled in the art to which it appertains to make and use the same.

This invention is an improvement in roller bearings, of the type shown in my copending application, Serial No. 474,212, filed June 1, 1921, of which this application is a continuation.

Each of the rollers used in this improved bearing not only serves its purpose as a roller of the roller bearing, but also performs the additional function of taking up end thrust. Suitable races are provided for transmitting the end thrust from the axle to the rollers, and for taking up this end thrust from the rollers. The races mounted on the axle are adjustably mounted thereon in such a manner that they are tightly clamped in position.

Furthermore, the rollers are mounted in a pair of mounting rings in a novel manner. According to this invention, ball and socket means are used for mounting the rollers in the mounting rings. In the preferred form, the ball elements are carried in the mounting rings and project into hemispherical sockets in the ends of the rollers. The ball elements may be given the desired temper so that there is no danger of their breaking or shearing.

Another feature of the invention is the formation of the rods that connect one mounting ring to the other for holding them in proper spaced relation. If rollers are used, each of which is provided with a collar intermediate the ends thereof for taking up end thrust, it has been found that considerable space may be saved by using rods which have a reduced section adjacent the collars. By the use of rods constructed in this manner, it has been found that one additional roller may be used in a bearing of a given size due to the saving in space. Or, to put the matter in another way, larger, and therefore sturdier, collars may be used with a given number of rollers. To thus reduce the diameter of the intermediate section of these rods does not produce any detrimental effect on the strength of the bearing as a whole due to the fact that these rods serve principally to transmit axial strains. The ends of these rods are of considerably larger cross sections than the intermediate portion. By this construction a relatively large area of contact is secured between the rods and the mounting rings thus producing a strong construction.

Another advantageous feature of the invention is that the roller bearing elements may be put in place and taken out while in the assembled condition. This is of considerable advantage in repairing and replacement of parts and means that in case of trouble with one bearing it may be slipped out and another one put in place quickly and expeditiously.

In addition to the mentioned advantages, the invention also comprises improved structural details which will be described in reference to the accompanying drawing, which illustrates a preferred embodiment of the invention. It should, of course, be understood that the invention is not limited to the precise structural details illustrated in this drawing, but that the invention may be carried out in other ways.

Referring now to this drawing, Fig. 1 is a view, mostly in section, taken on the line 1—1 of Fig. 2;

Figure 1:
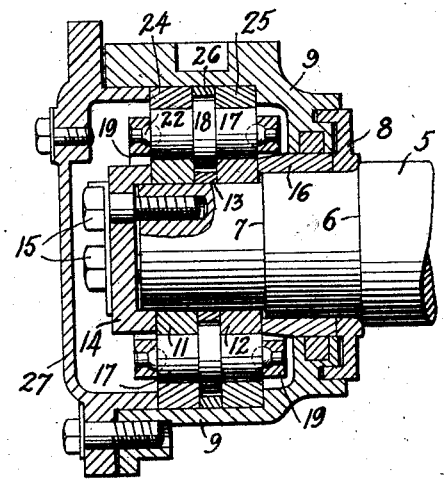
Figure 2:
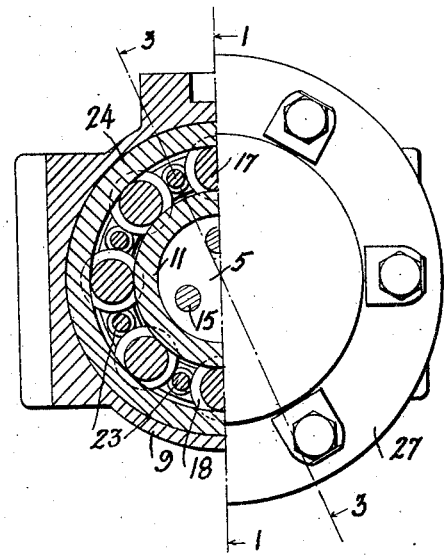
Fig. 2 is an end view, partly in section of the bearing.
Figure 3:
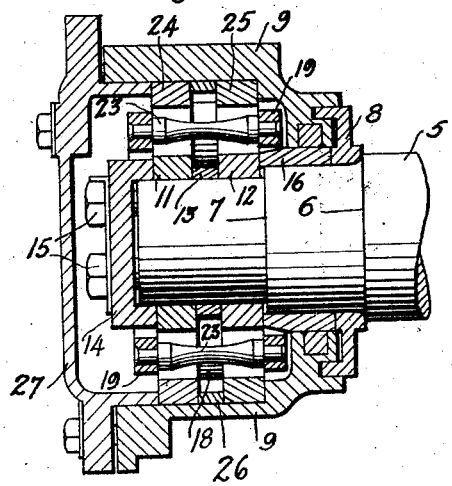
Fig. 3 is a view, partly in section, taken on the line 3—3 of Fig. 2.

The axle with which the bearing of the invention is associated, is indicated at 5 and is provided with shoulders 6 and 7. A collar 8 and a housing element 9 are mounted as shown to form a part of the housing around the bearing. Near the end of the axle are mounted two race elements 11 and 12, which are spaced apart by a thin bushing 13. A presser or clamping plate 14, which is held to the end of the axle by bolts 15, serves to clamp these three elements against a ring 16, so that the races are practically rigid with the axle, at least as far as transmitting axial thrust is concerned.

Figure 4:
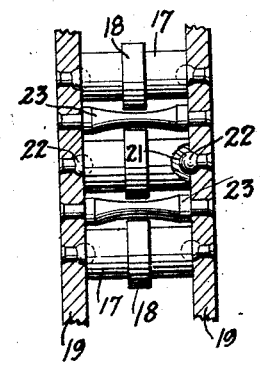
Fig. 4 is a development, in plan view, of the collars and associated parts.

The rollers 17 of the roller bearing are each provided with a collar 18 intermediate the ends thereof; these rollers are held in spaced relation by a pair of mounting rings 19, ball and socket means being used to connect the rollers with the mounting rings. Referring to Fig. 4, a socket 21, preferably hemispherical in shape, is cut in each end of each roller. Ball elements 22, carried by the mounting rings 19, and rigidly held by the mounting rings in any suitable manner, project into the hemispherical sockets 21, thus forming a ball and socket mounting permitting rotary movement of the rollers.

The mounting rings 19 are spaced apart by a plurality of connecting or spacer rods 23, which are reduced intermediate their ends, at a point adjacent the collars 18. This gives more space for such collars, and with collars of a given size, enables the use of an extra roller or two in a given bearing; or, with a given number of rollers, the collars may be made larger and stronger. The ends of the rods 23 are of relatively large cross section, and, therefore, the areas of contact between the ends of these rods and the mounting rings 19 are large.

Races 24 and 25, mounted on the inside of the housing 9 are held apart by the thin bushing 26, cooperating with the roller 17 and the collar 18 for receiving end thrust from the collars. The races 24, 25 and the bushing 26 are held in place by the clamping plate 27.

In case of wear, the thin bushings 13 and 26 are readily renewable, as are the other bushings. The inner bushings 11 and 12 take up the end thrust from the axle, transmit it to the collar 18 which in turn transmits it to the bushings 24 and 25 which absorb it. The described bearing, by the use of the ball and socket mounting and by the use of the tapered rods, which enable the insertion of an extra roller, give a strong and sturdy bearing of a few parts and one not liable to get out of order. An important feature of the invention is that the races transmitting end thrust to and from the rollers can be readily adjusted to their proper spaced relation. Another important feature is that the bearing can be inserted and removed in assembled condition by endwise movement with respect to the axle.

I claim as my invention:—

In a roller bearing, the combination of a plurality of rollers each provided with a collar intermediate its ends, a pair of mounting rings for holding the collars in spaced relation, a pair of inner races and a pair of outer races on opposite sides of the collars, ball and socket means for connecting the rollers to the mounting rings, rods for holding the mounting rings in spaced relation, each rod having a small cross section at its middle portion and a relatively large cross section at each end thereof, and means for clamping said inner and outer races in position.

In testimony whereof I affix my signature.

LEO FLESCH.